(12) United States Patent
Yang

(10) Patent No.: US 11,824,297 B2
(45) Date of Patent: Nov. 21, 2023

(54) CONNECTION TERMINAL AND POWER SUPPLY DEVICE

(71) Applicant: Nanjing Chervon Industry Co., Ltd., Nanjing (CN)

(72) Inventor: Qingsong Yang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 48 days.

(21) Appl. No.: 17/571,001

(22) Filed: Jan. 7, 2022

(65) Prior Publication Data

US 2022/0224036 A1 Jul. 14, 2022

(30) Foreign Application Priority Data

Jan. 14, 2021 (CN) .......................... 202110048687.6

(51) Int. Cl.
*H01R 13/24* (2006.01)
*H01M 50/296* (2021.01)
*H01M 50/204* (2021.01)
*H02J 7/00* (2006.01)

(52) U.S. Cl.
CPC .......... *H01R 13/24* (2013.01); *H01M 50/204* (2021.01); *H01M 50/296* (2021.01); *H02J 7/0045* (2013.01)

(58) Field of Classification Search
CPC ........ H01R 13/24; H01R 13/22; H01R 13/20; H01R 13/2407; H01R 13/2414; H01R 13/245; H01R 13/2457; H01R 13/2492; H01M 50/204; H01M 50/296; H02J 7/0045

See application file for complete search history.

(56) References Cited

U.S. PATENT DOCUMENTS

| 3,076,953 | A |   | 2/1963  | Sloop     |                     |
|-----------|---|---|---------|-----------|---------------------|
| 3,152,857 | A | * | 10/1964 | Fisher    | H01R 13/15          |
|           |   |   |         |           | 200/290             |
| 4,472,017 | A | * | 9/1984  | Sian      | H01R 13/115         |
|           |   |   |         |           | 439/747             |
| 4,537,462 | A | * | 8/1985  | Manabe    | H01R 13/18          |
|           |   |   |         |           | 439/833             |
| 5,035,661 | A | * | 7/1991  | Steinhardt| H01R 13/4223        |
|           |   |   |         |           | 439/595             |

(Continued)

FOREIGN PATENT DOCUMENTS

| EP | 2448066 A1 | 5/2012 |
| FR | 2565423 A1 | 12/1985 |
| GB | 2314468 A  | 12/1997 |

*Primary Examiner* — Harshad C Patel
(74) *Attorney, Agent, or Firm* — Greenberg Traurig, LLP

(57) ABSTRACT

A connection terminal includes a body portion having a first end disposed on a power supply device and a second end opposite to the first end, two connection pieces, and a support portion supporting the two connection pieces and disposed at the second end of the body portion. An inner clamping space for clamping an electrode piece is formed between the two connection pieces. The support portion connects the two connection pieces and the body portion, an inner side surface of each of the two connection pieces comprises a contact surface for connecting with the electrode piece, and the contact surface extends along a first plane so that the contact surface is capable of being in surface contact with the electrode piece.

18 Claims, 6 Drawing Sheets

(56) References Cited

U.S. PATENT DOCUMENTS

| | | | |
|---|---|---|---|
| 6,561,828 B2* | 5/2003 | Henrici | H01R 33/0827 |
| | | | 439/239 |
| 7,581,972 B2* | 9/2009 | Daamen | H01R 13/6315 |
| | | | 439/249 |
| 8,388,389 B2* | 3/2013 | Costello | H01R 13/26 |
| | | | 439/637 |
| 9,537,242 B2* | 1/2017 | Chen | H01R 13/18 |
| 9,634,413 B2* | 4/2017 | Hashiguchi | H01R 13/113 |
| 9,680,236 B2* | 6/2017 | Ngo | H01R 4/48 |
| 10,050,395 B2* | 8/2018 | Ngo | H01R 13/6275 |
| 10,566,886 B2* | 2/2020 | Posselt | H01R 13/193 |
| 10,879,647 B2* | 12/2020 | Brungard | H01R 13/631 |
| 11,545,775 B2* | 1/2023 | Liu | H01R 13/187 |
| 2013/0012072 A1* | 1/2013 | Costello | H01R 13/18 |
| | | | 439/786 |
| 2014/0158395 A1* | 6/2014 | Billman | H02B 7/00 |
| | | | 174/68.2 |
| 2019/0089093 A1* | 3/2019 | Liu | H01R 4/46 |

* cited by examiner

CONNECTION TERMINAL AND POWER SUPPLY DEVICE

RELATED APPLICATION INFORMATION

This application claims the benefit under 35 U.S.C. § 119(a) of Chinese Patent Application No. CN 202110048687.6, filed on Jan. 14, 2021, which application is incorporated herein by reference in its entirety.

BACKGROUND

A battery pack is widely used in an electric tool to provide power for the electric tool. A battery connection terminal is disposed on the electric tool, a tool connection terminal is disposed on a battery pack, and when the battery pack is connected to the electric tool, the battery connection terminal and the tool connection terminal are plugged together to conduct power.

In the related art, the tool connection terminal is in contact with the battery connection terminal through two or more contact points, and the contact area is relatively small, so that the voltage drop of the battery path is large, the contact resistance is large, and thus the heating is serious when a large current is passed. In addition, the relatively large vibration will lead to single point contact or no point contact, which may easily cause sparking, affect the coating of the battery connection terminal, and cause the contact resistance to deteriorate.

SUMMARY

In one example, a connection terminal includes a body portion including a first end disposed on a power supply device and a second end opposite to the first end; two connection pieces, wherein an inner clamping space for clamping an electrode piece is formed between the two connection pieces; and a support portion supporting the two connection pieces and disposed at the second end of the body portion. The support portion connects the two connection pieces and the body portion, an inner side surface of each of the two connection pieces includes a contact surface for connecting with the electrode piece, and the contact surface extends along a first plane so that the contact surface is capable of being in surface contact with the electrode piece.

In one example, the support portion includes at least one support arm, and the at least one support arm abuts outer side surfaces of the two connection pieces.

In one example, the support portion is formed with a plurality of support arms, and the plurality of support arms abut the outer side surfaces of the two connection pieces so as to form a multi-point support for the two connection pieces.

In one example, five support arms are provided for each of the two connection pieces, one of the five support arms abuts a middle part of the each of the two connection pieces, and four of the five support arms abut four corners of the each of the two connection pieces.

In one example, the two connection pieces are symmetrical about a second plane, and the contact surface is gradually away from the second plane along an insertion direction of the electrode piece.

In one example, the two connection pieces are symmetrical about a second plane, and an included angle A between the first plane and the second plane is about 1 degree.

In one example, each of the two connection pieces includes a connection portion and a contact portion, the connection portion extends and bends relative to the contact portion, the connection portion is connected to the support portion, the contact portion is provided with the contact surface, and the inner clamping space is formed between two contact surfaces.

In one example, a bell-mouth structure is formed between two connection portions and the bell-mouth structure gradually increases along a direction away from the inner clamping space.

In one example, a notch is provided at an intersection of the connection portion and the support portion, and the notch extends toward the inner clamping space.

In one example, the body portion, the support portion, and the two connection pieces are integrally formed.

In one example, the connection terminal further including a heat sink, wherein the heat sink is connected to the body portion and extends toward a direction away from the support portion.

In one example, the support portion includes a main body connecting the body portion and the two connection pieces and a support arm for abutting an outer side surface of the two connection pieces.

In one example, each of the two connection pieces includes a connection portion and a contact portion, the connection portion extends and bends relative to the contact portion, the connection portion is connected to the support portion, the contact portion is provided with the contact surface, the inner clamping space is formed between two contact surfaces, and the support arm abuts the contact portion.

In one example, the support portion includes a plurality of support arms for abutting the contact portion.

In one example, a power supply device includes a housing and a connection terminal. The connection terminal includes: a body portion including a first end disposed on the power supply device and a second end opposite to the first end; a first connection piece and a second connection piece, an inner clamping space for clamping an electrode piece being formed between the first connection piece and the second connection piece; and a support portion supporting the first connection piece and the second connection piece. The inner side surface of the first connection piece includes a first contact surface for connecting with the electrode piece, the inner side surface of the second connection piece includes a second contact surface for connecting with the electrode piece, and the first contact surface extends along a first plane so that the first contact surface is capable of being in surface contact with the electrode piece.

The beneficial effects of the present disclosure are described below.

According to the connection terminal provided by the present disclosure, the support portion is connected to the body portion to support the two connection pieces; the two connection pieces bend toward each other so that the connections pieces have certain resilience; the inner clamping space is formed between the two connection pieces for clamping the electrode piece, and the inner side surfaces of the two connection pieces are formed as planes to enable the electrode piece to be in surface contact with each of the two connection pieces, so that the contact area between the connection terminal and the electrode piece is increased, the contact resistance is reduced, and thereby the problem of heating of the battery pack is ameliorated; at the same time, the poor contact caused by the contact force and vibration is improved, the influence caused by the vibration is further reduced, and the connection is more stable.

DETAILED DESCRIPTION

Figure 1:
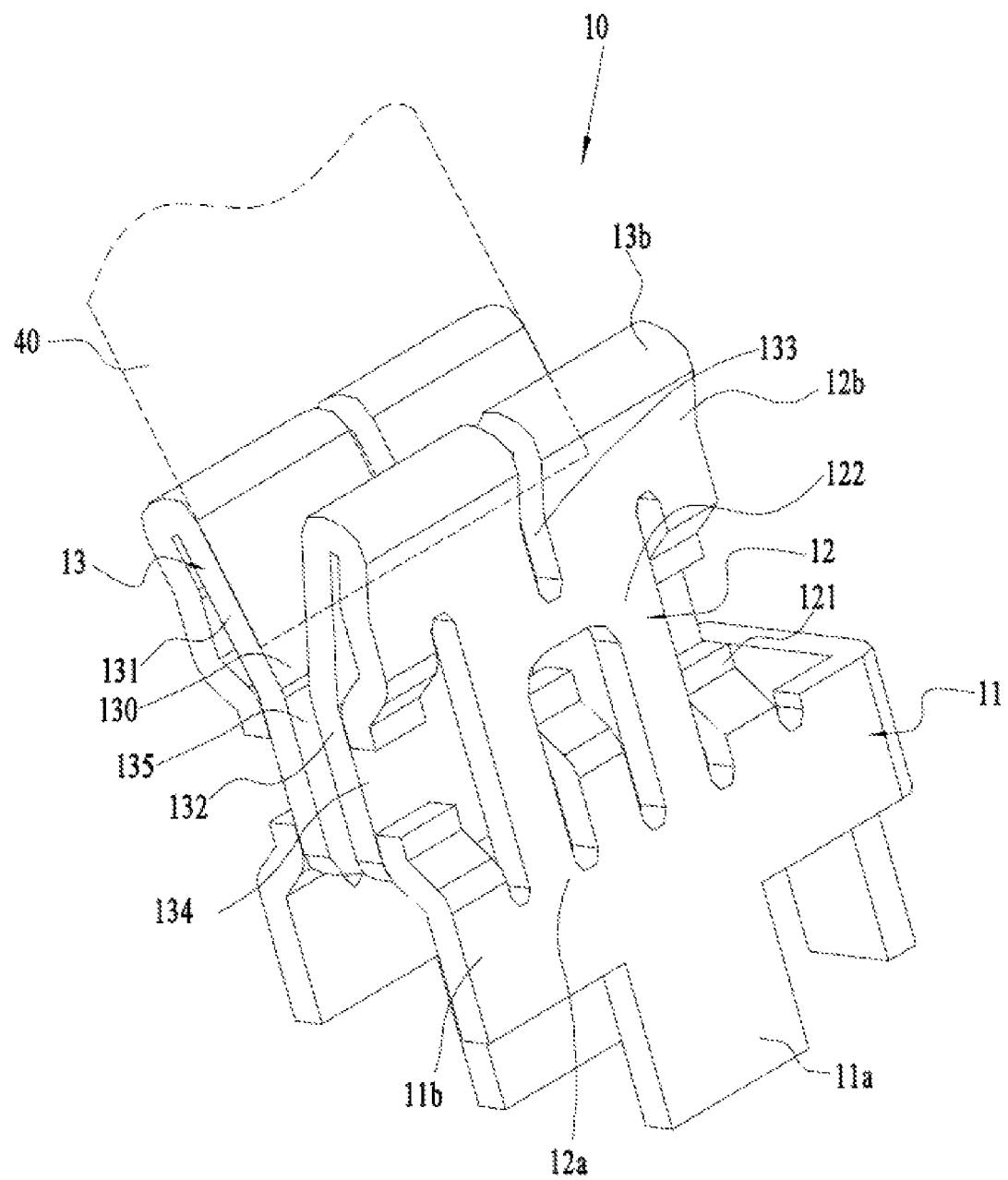
FIG. 1 is a structural view of a connection terminal according to example one of the present disclosure.

Examples in accordance with the present disclosure are described in detail hereinafter. Examples are illustrated in the drawings, where the same or similar reference numerals indicate the same or similar elements or elements having the same or similar functions. The examples are intended to explain the present disclosure and are not to be construed as limiting the present disclosure.

In the description of the present disclosure, unless otherwise expressly specified and limited, the term "connected to each other", "connected", or "secured" is to be construed in a broad sense, for example, as securely connected, detachably connected or integrated; mechanically connected or electrically connected; directly connected to each other or indirectly connected to each other via an intermediary; or internally connected between two components or interaction relations between two components. For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact or be in contact via another feature between the two features. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Technical solutions of the present disclosure are further described hereinafter in conjunction with the drawings and the examples.

Figure 2:
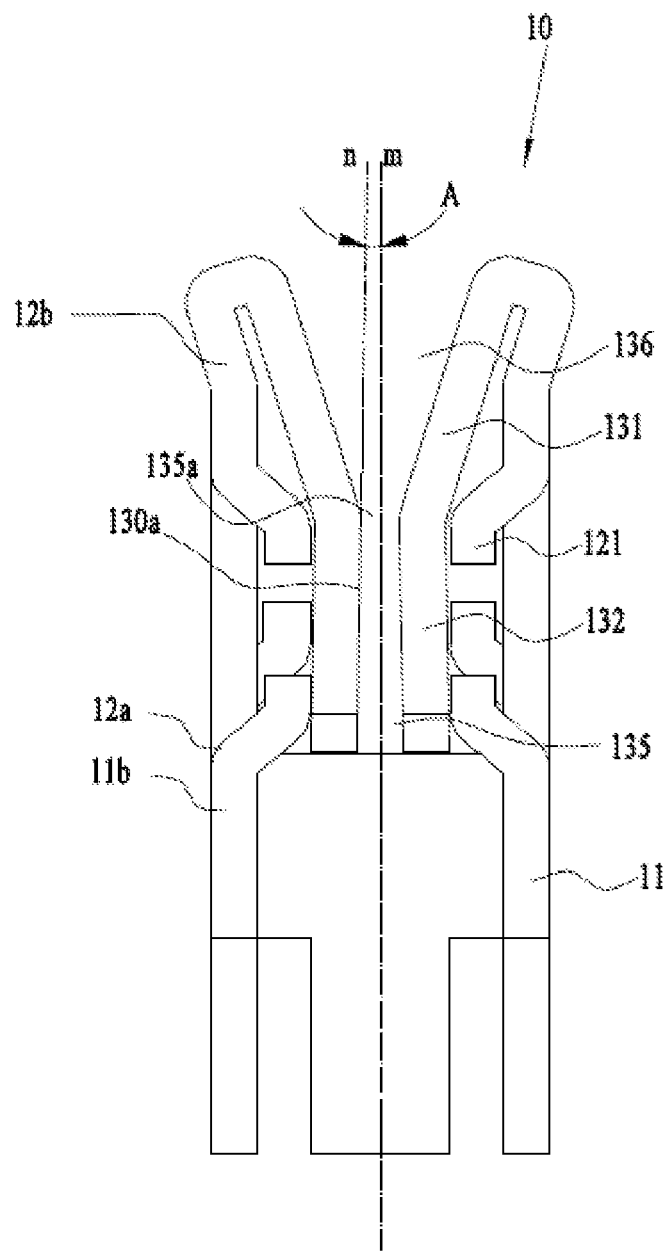
FIG. 2 is a front view of the connection terminal according to example one of the present disclosure.

Referring to FIGS. 1 to 2, the example of the present disclosure provides a connection terminal 10, and the connection terminal 10 may be an electrode. The connection terminal 10 includes a body portion 11, a support portion 12, and two connection pieces 13. The two connection pieces 13 are specifically a first connection piece 13*a* and a second connection piece 13*b*. A first end 11*a* of the body portion 11 is disposed on a battery pack or a power tool, a second end 11*b* of the body portion 11 is connected to a first end 12*a* of the support portion 12, and the two connection pieces 13*a*, 13*b* are disposed on a second end 12*b* of the support portion 12 facing away from the body portion 11. The two connection pieces 13*a*, 13*b* bend toward each other, an inner clamping space 135 is formed between the two connection pieces 13*a*, 13*b* for clamping an electrode piece 40, and inner side surfaces 130 of the two connection pieces 13*a*, 13*b* are formed as planes to enable the electrode piece 40 to be in surface contact with each of the two connection pieces 13*a*, 13*b*. Each of the inner side surfaces 130 comprises a contact surface 130*a* for connecting the electrode piece 40, the contact surface 130*a* is a plane extending along a first plane n so that the each of the two connection pieces 13*a*, 13*b* is in surface contact with the electrode piece 40.

Since the connection pieces 13*a*, 13*b* are in surface contact with the electrode piece 40, the contact area between the connection terminal 10 and the electrode piece 40 can be increased to reduce the contact resistance and thereby ameliorate the problem of heating of the battery pack or the power tool. At the same time, the poor contact caused by the contact force and vibration can be improved, so that the influence caused by the vibration can be further reduced and the connection can be more stable.

In the example, the body portion 11 is formed in a U-shape, the support portion 12 is disposed on opposite sides of the body portion 11, the connection pieces 13*a*, 13*b* are disposed on the end portion of the support portion 12, and the two connection pieces 13*a*, 13*b* bend toward each other.

The body portion 11, the support portion 12, and the connection pieces 13*a*, 13*b* are integrally formed to facilitate processing and production and ensure the structural strength. The connection between the support portion 12 and each connection piece 13 bends in an arc shape, so that the connection pieces 13*a*, 13*b* have a certain resilience.

The support portion 12 includes a main body 122 and multiple support arms 12 and the multiple support arms 121 extend from the main body 122 to the connection pieces 13*a*, 13*b*, so multiple support arms 121 abut outer side surfaces 134 of the connection pieces 13*a*, 13*b*. The outer side surfaces 134 is opposite to the inner side surfaces 130. When the electrode piece 40 is inserted into the inner clamping space 135, the inner side surfaces 130 of the connection pieces 13*a*, 13*b* abut the electrode piece 40, and the outer side surfaces 134 of the connection pieces 13*a*, 13*b* abut the support arms 121, so that the inner sides and outer side surfaces of the connection pieces 13*a*, 13*b* are supported, and the plugging stability of the electrode piece 40 is ensured.

Specifically, the support arms 121 bend toward the connection pieces 13*a*, 13*b* relative to the support portion 12, so as to abut the connection pieces 13*a*, 13*b*.

Support arms 121 on the outer side 134 of one of the two connection pieces 13*a*, 13*b* are arranged in the same form as support arms 121 on the outer side 134 of the other one of the two connection pieces 13*a*, 13*b*, so that the clamping forces of the two connection pieces 13*a*, 13*b* to the electrode piece are consistent and uniform.

In the example, five support arms 121 are provided for each connection piece 13, one of the five support arms 121 abuts a middle part of each connection piece 13, and four of the five support arms 121 abut four corners of the each connection piece 13, so that each connection piece 13 is uniformly stressed as a whole.

Specifically, each connection piece 13 includes a connection portion 131 and a contact portion 132, the connection portion 131 extends and bends relative to the contact portion 132, the connection portion 131 is connected to the support portion 12, and the inner clamping space 135 is formed between two contact portions 132. The inner side of each of the two contact portions 132 is provided the contact surface 130a. The connection portion 131 serves as a transition so that the two contact portions 132 can approach each other. Five support arms 121 abut the outer side of the contact portion 132.

A bell-mouth structure 136 is formed between the two connection portions 131, and the bell-mouth structure 136 gradually increases along a direction away from the inner clamping space 135, so as to facilitate the insertion of the electrode piece 40 into the inner clamping space 135.

A notch 133 is provided at a junction of the connection portion 131 and the support portion 12, and the notch 133 extends toward the inner clamping space. The notch 133 is provided so that the resilience of the connection between the connection pieces 13a, 13b and the support portion 12 is enhanced and a certain space is provided for the deformation of the connection pieces 13a, 13b.

The inner clamping space 135 is formed between the contact surface 130a of the two connection pieces 13a, 13b, and the connection position between the connection portion 131 and the contact portion 132 is an entrance end 135a of the inner clamping space 135. If the inner side surfaces of the two connection pieces are parallel and thus the inner clamping space is rectangular, then, when the electrode piece 40 is inserted into the inner clamping space, the contact portion tends to tilt due to the leverage effect, resulting in that opening distances of two ends of the inner clamping space are different and the connection pieces cannot be in full contact with the electrode piece 40.

In the example, the shape of the inner clamping space 135 is an isosceles trapezoid, and along an insertion direction of the electrode piece 40, the inner clamping space 135 gradually increases.

Specifically, the first connection piece 13a is symmetrical to the second connection piece 13b about a second plane m, an included angle between each of the contact surface 130a of the two connection pieces 13a, 13b and the second plane m is a set angle, and the contact surface 130a are gradually away from the second plane m along the insertion direction of the electrode piece 40. The contact surface 130a is inclined to the second plane m.

In FIG. 2, the second plane is represented by m, the first plane n is an extended plane of the contact surface 130a, and the included angle between the first plane n and the second plane m is represented by A.

When the electrode piece 40 is inserted into the inner clamping space 135, the electrode piece 40 first squeezes the connection position between the connection portion 131 and the contact portion 132. Since the contact portion 132 is pre-tilted outward, the problem can be solved of the difference in the opening distances of the two ends of the inner clamping space 135 caused by the leverage effect, so that the connection pieces 13a, 13b can be in full contact with the electrode piece 40 to ensure the insertion stability of the electrode piece 40.

The angle of the included angle A may be set according to actual conditions and is not limited here. In the example, the included angle is about 1 degree.

Figure 3:
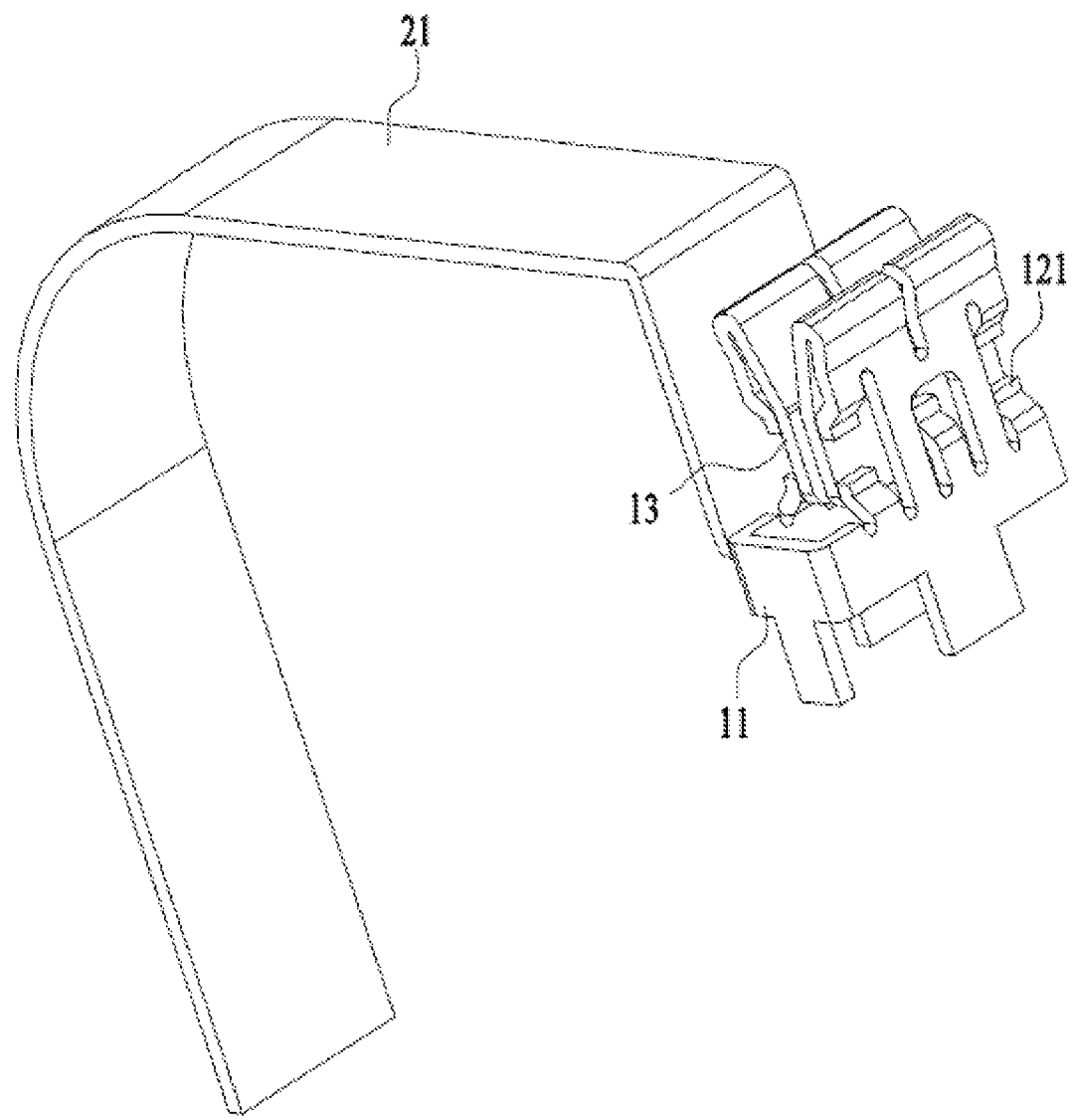
FIG. 3 is a structural view of a connection terminal according to example two of the present disclosure.
Figure 4:
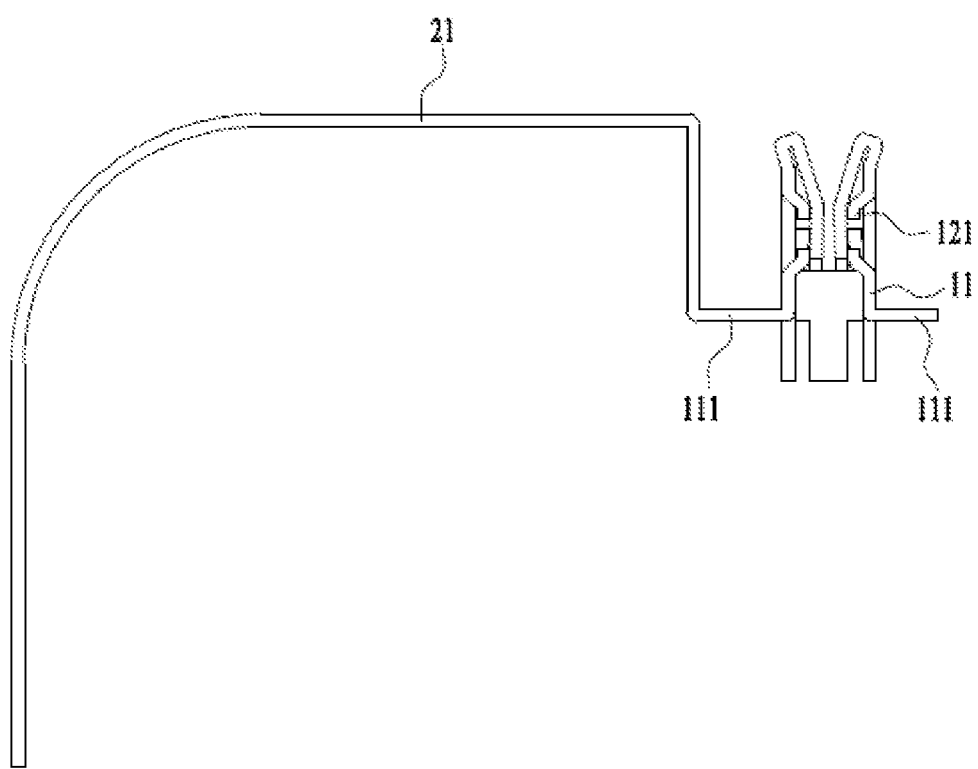
FIG. 4 is a front view of the connection terminal according to example two of the present disclosure.

FIGS. 3 and 4 show another example, in which the same or corresponding parts as in the preceding example are denoted by the corresponding reference numerals. For brevity, only the difference between the example of FIGS. 3 and 4 and the preceding example is described below. The difference is that the connection terminal 10 further includes a heat sink 21. The heat sink 21 is connected to the body portion 11 and extends toward a direction away from the support portion 12. The heat sink 21 is provided so that the heat capacity of the connection terminal 10 is increased, the contact area between the connection terminal 10 and the air is also increased, and thereby the heat dissipation area is increased. Therefore, heat accumulation is avoided, so that the impact of a large current on the performance of the battery pack is reduced.

Specifically, one side of the body portion 11 is provided with an extension portion 111, the extension portion 111 extends in the direction away from the support portion 12, and the heat sink 21 is connected to the extension portion 111 to adapt to the mounting space of the connection terminal 10.

The shape of the heat sink 21 may be set according to actual requirements. In the example, the heat sink 21 includes a straight portion and an arc-shaped portion, which increase the heat dissipation area of the heat sink 21 and also adapt to the mounting space of the heat sink 21.

Figure 5:
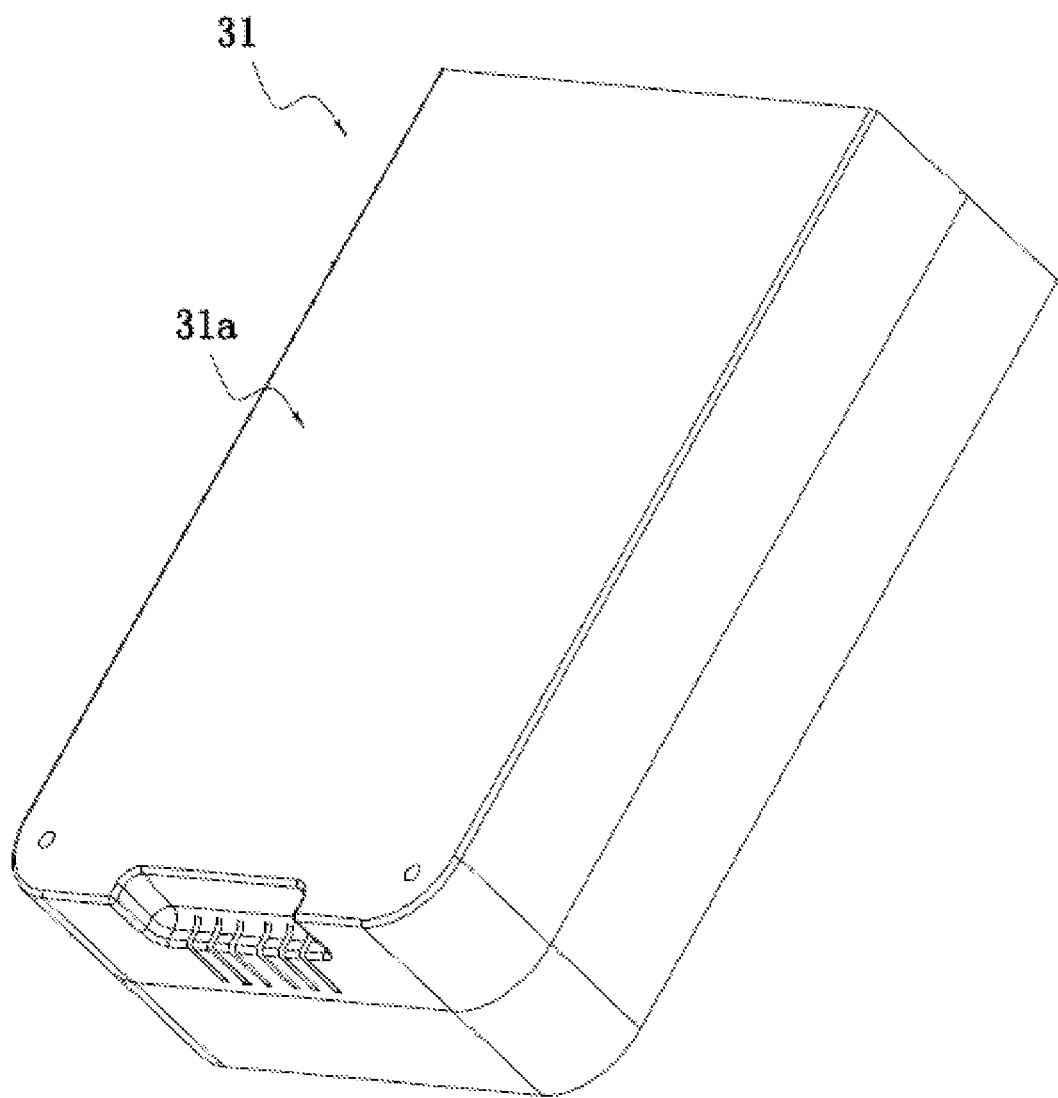
FIG. 5 is a structural view of a power supply device according to an example of the present disclosure.

Referring to FIG. 5, the example of the present disclosure further provides a power supply device 31, specifically providing a battery pack, which includes a housing 31a and the connection terminal 10 of any one of the preceding examples.

Figure 6:
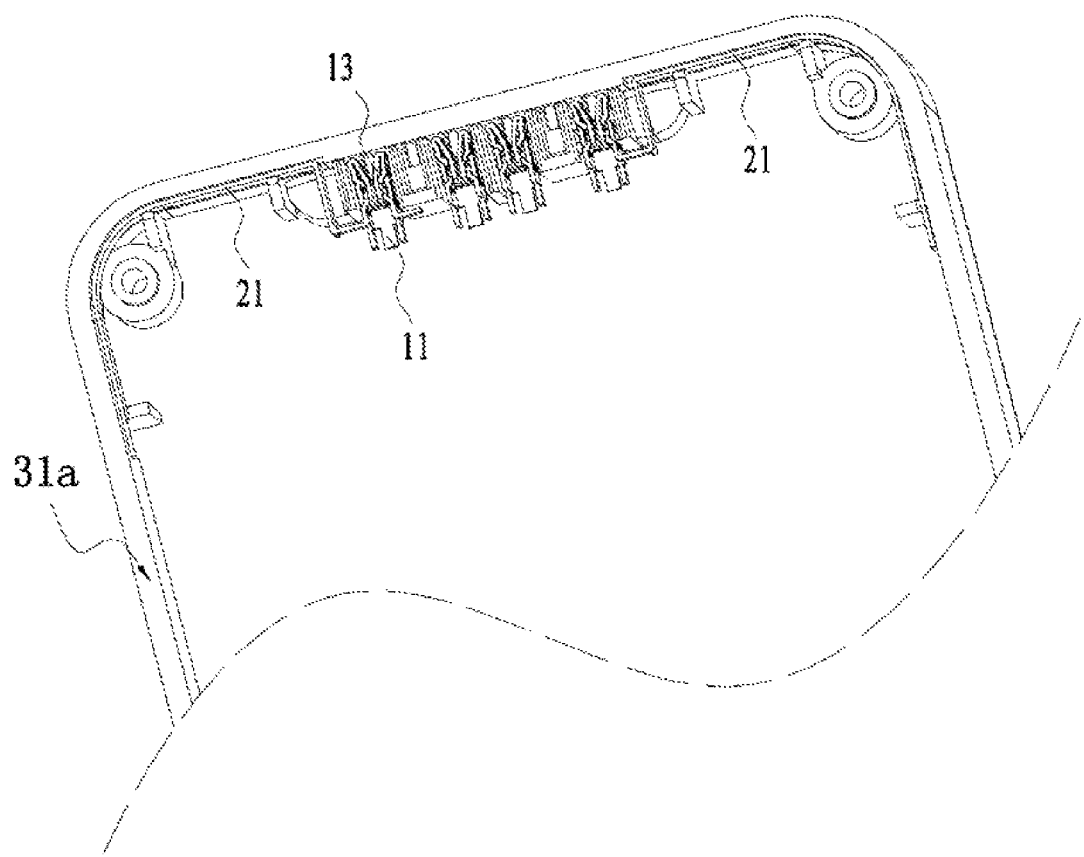
FIG. 6 is an enlarged view of a partial structure of the power supply device of FIG. 5.

Referring to FIGS. 5 to 6, a mounting groove is provided in the housing 31a of the battery pack, and the connection terminal 10 is inserted into the mounting groove. A limit groove is provided in the housing, and the heat sink 21 is inserted into the limit groove. The limit groove is provided along the inner wall of the housing 31a to reduce space occupation.

The preceding examples illustrate only the basic principles and features of the present disclosure. The present disclosure is not limited by the preceding examples. Various modifications and variations made without departing from the spirit and scope of the present disclosure fall within the scope of the present disclosure. The scope of the present disclosure is defined by the appended claims and their equivalents.

What is claimed is:

1. A connection terminal, comprising:
   a body portion comprising a first end disposed on a power supply device and a second end opposite to the first end;
   two connection pieces between which an inner clamping space for clamping an electrode piece is formed; and
   a support portion supporting the two connection pieces and disposed at the second end of the body portion;
   wherein the support portion connects the two connection pieces and the body portion, an inner side surface of each of the two connection pieces comprises a contact surface for connecting with the electrode piece, and the contact surface extends along a first plane so that the contact surface is capable of being in surface contact with the electrode piece,
   wherein the support portion comprises at least one support arm and the at least one support arm abuts an outer side surfaces of the two connection pieces, and
   wherein five support arms are provided for each of the two connection pieces, one of the five support arms abuts a middle part of each of the two connection pieces, and four of the five support arms abut four corners of each of the two connection pieces.

2. The connection terminal according to claim 1, wherein the support portion is formed with a plurality of support arms and the plurality of support arms abut the outer side surfaces of the two connection pieces so as to form a multi-point support for the two connection pieces.

3. The connection terminal according to claim 1, wherein the two connection pieces are symmetrical about a second plane and the contact surface extends gradually away from the second plane along an insertion direction of the electrode piece.

4. The connection terminal according to claim 1, wherein the two connection pieces are symmetrical about a second plane and an included angle A between the first plane and the second plane is about 1 degree.

5. The connection terminal according to claim 1, wherein each of the two connection pieces comprises a connection portion and a contact portion, the connection portion extends and bends relative to the contact portion, the connection portion is connected to the support portion, the contact portion is provided with the contact surface, and the inner clamping space is formed between two contact surfaces.

6. The connection terminal according to claim 5, wherein a bell-mouth structure is formed between two connection portions and the bell-mouth structure gradually increases in area along a direction away from the inner clamping space.

7. The connection terminal according to claim 5, wherein a notch is provided at an intersection of the connection portion and the support portion and the notch extends toward the inner clamping space.

8. The connection terminal according to claim 1, wherein the body portion, the support portion, and the two connection pieces are integrally formed.

9. The connection terminal according to claim 1, further comprising a heat sink, wherein the heat sink is connected to the body portion and extends toward a direction away from the support portion.

10. The connection terminal according to claim 1, wherein the support portion comprises a main body connecting the body portion and the two connection pieces and a support arm for abutting an outer side surface of the two connection pieces.

11. The connection terminal according to claim 10, wherein each of the two connection pieces comprises a connection portion and a contact portion, the connection portion extends and bends relative to the contact portion, the connection portion is connected to the support portion, the contact portion is provided with the contact surface, the inner clamping space is formed between two contact surfaces, and the support arm abuts the contact portion.

12. The connection terminal according to claim 11, wherein the support portion comprises a plurality of support arms for abutting the contact portion.

13. A power supply device, comprising a housing and a connection terminal,
wherein the connection terminal comprises:
a body portion comprising a first end disposed on the power supply device and a second end opposite to the first end;
a first connection piece and a second connection piece between which an inner clamping space for clamping an electrode piece is formed; and
a support portion supporting the first connection piece and the second connection piece;
wherein an inner side surface of the first connection piece comprises a first contact surface for connecting with the electrode piece, the inner side surface of the second connection piece comprises a second contact surface for connecting with the electrode piece, and the first contact surface extends along a first plane so that the first contact surface is capable of being in surface contact with the electrode piece,
wherein the support portion comprises at least one support arm and the at least one support arm abuts an outer side surface of the first connection piece, and
wherein five support arms are provided for the first connection piece, one of the five support arms abuts a middle part of the first connection piece, and four of the five support arms abut four corners of the first connection piece.

14. The power supply device according to claim 13, wherein the support portion comprises at least one support arm and the at least one support arm abuts an outer side surface of the first connection piece.

15. The power supply device according to claim 13, wherein the first connection piece is symmetrical to the second connection piece about a second plane, and the first contact surface extends gradually away from the second plane along an insertion direction of the electrode piece.

16. The power supply device according to claim 13, wherein the support portion comprises a main body connecting the body portion and the first connection piece and a support arm for abutting an outer side surface of the first connection piece.

17. The power supply device according to claim 13, wherein the body portion, the support portion, the first connection piece, and the second connection piece are integrally formed.

18. The power supply device according to claim 13, wherein the inner clamping space is an isosceles trapezoid.

* * * * *